United States Patent [19]

Roppolo, III

[11] Patent Number: 5,154,317

[45] Date of Patent: Oct. 13, 1992

[54] PORTABLE LIQUID DISPENSER

[76] Inventor: Michael A. Roppolo, III, 5315 Loyola St., New Orleans, La. 70115

[21] Appl. No.: 550,292

[22] Filed: Jul. 9, 1990

[51] Int. Cl.$^5$ .............................................. A01C 5/64
[52] U.S. Cl. ...................................... 222/66; 222/63; 222/608; 222/331; 222/382; 222/529; 222/530
[58] Field of Search ................. 222/63, 175, 180, 330, 222/331, 333, 382, 608, 66, 626, 529, 530

[56] References Cited

U.S. PATENT DOCUMENTS

| | | | |
|---|---|---|---|
| 1,486,073 | 3/1924 | Coates | 222/608 |
| 2,350,184 | 5/1944 | Oys | 222/175 |
| 2,575,936 | 11/1951 | Andrews | 222/175 |
| 3,142,443 | 7/1964 | Morgan | 222/608 |
| 3,976,227 | 8/1976 | Ray | 222/608 |
| 4,193,518 | 3/1980 | Holmes | 222/175 |
| 4,456,149 | 6/1984 | Sciortino | 222/63 |
| 4,801,088 | 1/1989 | Baker | 222/333 |

Primary Examiner—Gregory L. Huson
Attorney, Agent, or Firm—Keaty & Keaty

[57] ABSTRACT

The invention relates to portable liquid dispensers for transporting large quantities of liquid to a predetermined location and for dispensing the drinking liquid on demand. The liquid dispensing unit provides for the use of a hand truck which supports and carries an insulated hollow container suitable for retaining the drinking liquid. A rechargeable battery is positioned in a housing, the latter being detachably secured to the frame of the hand truck. A pump, electrically connected to the rechargeable battery, has a pressure switch which is activated when a drop of pressure in the fluid line is detected. The intake side of the pump is connected by a flexible hose to the interior of the container and the discharge side of the pump is connected to a manifold carried by the frame of the hand truck. A plurality of liquid dispensing hoses are connected to the manifold, each dispensing hose being provided with a handle control which opens, closes and controls flow rate and the fluid communication between the container and the dispensing hose. The pressure switch is activated by moving the handle control into the open position, which in turn activates the pump to supply drinking liquid upon demand.

29 Claims, 3 Drawing Sheets

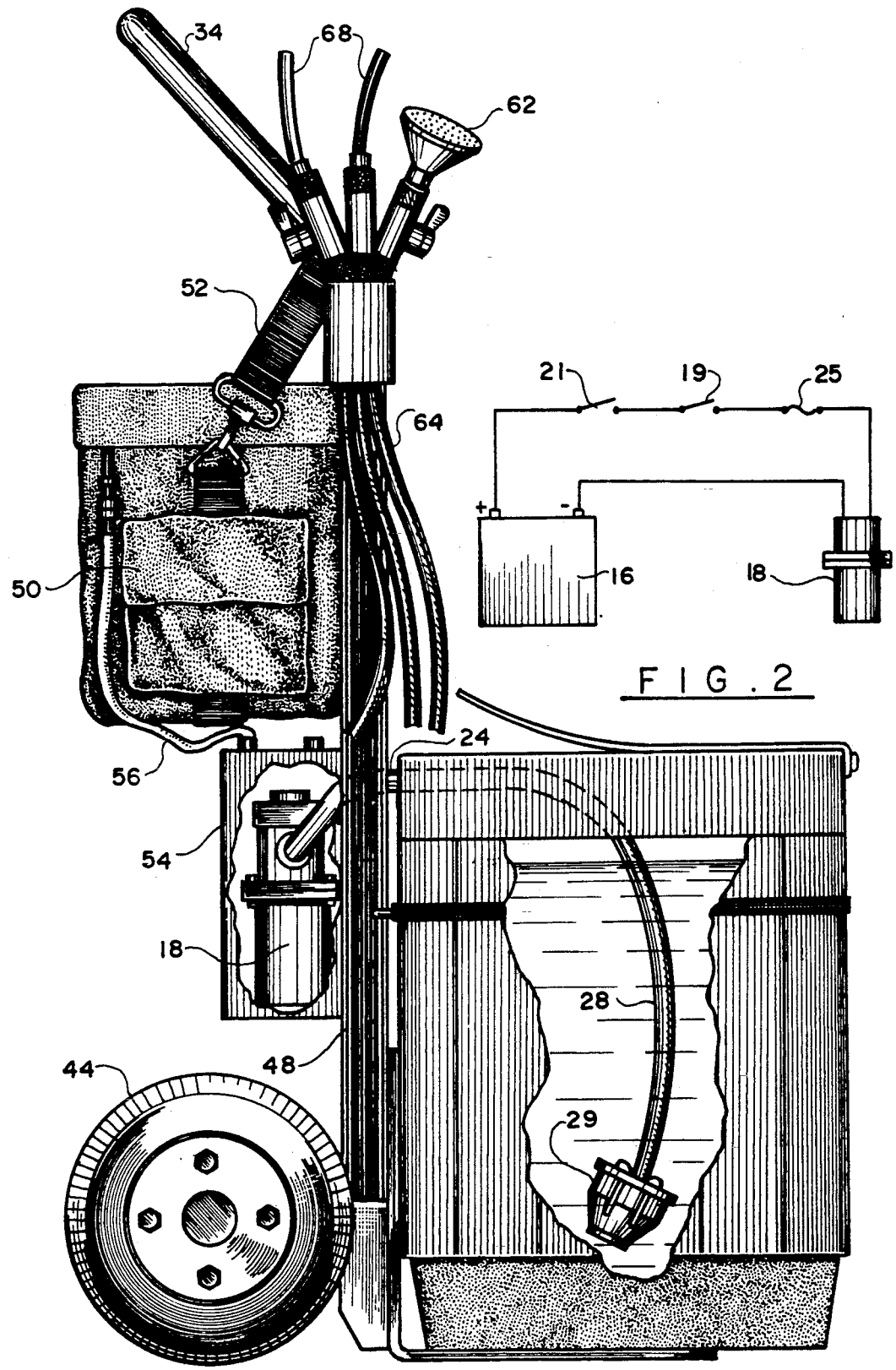

PORTABLE LIQUID DISPENSER

BACKGROUND OF THE INVENTION

The present invention relates to drinking liquid dispensers or drinking fountains, and more particularly to a self contained portable unit which can be manually transported to a predetermined location for dispensing of liquid.

During training or competition games sportsmen engage in strenuous activities, during which time a lot of body water is lost. To compensate for the loss of liquid, sportsmen need to consume large amounts of liquids which should be preferably available at the site of training or in a competition field. The acceptable practice so far was to bring gallon jugs of water or other liquids directly onto the field to make it easily available for the athletes.

However, such approach has disadvantages as numerous bottles or jugs of water have to be carried to the site by hand and, when exposed to heat, easily transfer the heat to the liquid contained therein making it less appealing to the athletes.

The present invention contemplates elimination of the disadvantages associated with such approach and provision of a portable self-contained drinking dispenser which can be easily manually transported to the site of training or of an athletic event.

SUMMARY OF THE INVENTION

It is therefore an object of the present invention to provide a portable liquid beverage dispenser which can be manually transported to a predetermined location.

It is another object of the present invention to provide a liquid dispenser which has a portable power source and a motor means to allow easy dispensing of the liquid.

It is still a further object of the present invention to provide a portable liquid dispenser which has an insulated container means for retaining the liquid at the desired temperature.

It is still a further object of the present invention to provide a portable liquid dispenser which allows dispensing of liquid through a plurality of separate nozzles.

These and other objects of the present invention are achieved by provision of a portable liquid dispensing unit which comprises a hand truck or dolly having a frame supported by wheels and a base plate which supports an insulated liquid container means. An electric pump means is electrically connected to a power source, such as a rechargeable battery, to allow withdrawal of liquid from the insulated container means to a flexible hose which is connected to a main manifold means. A plurality of individual liquid dispensing means, such as conduits with a nozzle tip, are connected to the manifold, each individual dispensing conduit having a switch to regulate a valve for controlling a liquid flow through the conduit and which is suitable for opening or closing fluid communication between the manifold and the dispensing end of the conduit. A predetermined pressure is maintained on the outlet side of the pump and within the manifold and the dispensing conduits. The electrical connection between the power source and the pump is normally open. Once the demand for liquid is activated, the pressure drop in the conduit/manifold/pump system closes the circuit between the power source and the pump by means of a microswitch to activate the pump and allow withdrawal of liquid from the container to the dispensing unit.

An override switch overrides the pressure switch which regulates the operation of the pump preventing unnecessary drain on the power source (battery) when the container means is empty.

A pressure switch disconnects the battery from the pump when the pressure is below a normal operating pressure.

BRIEF DESCRIPTION OF THE DRAWINGS

For a better understanding of the nature and features of the present invention, reference will be made to the following detailed description taken in conjunction with the accompanying drawings, wherein

FIG. 2 is an electrical schematic diagram of wiring of the apparatus of the present invention.

FIG. 4 is a side view of the apparatus of the present invention.

DETAILED DESCRIPTION OF THE PREFERRED EMBODIMENT

Figure 1:
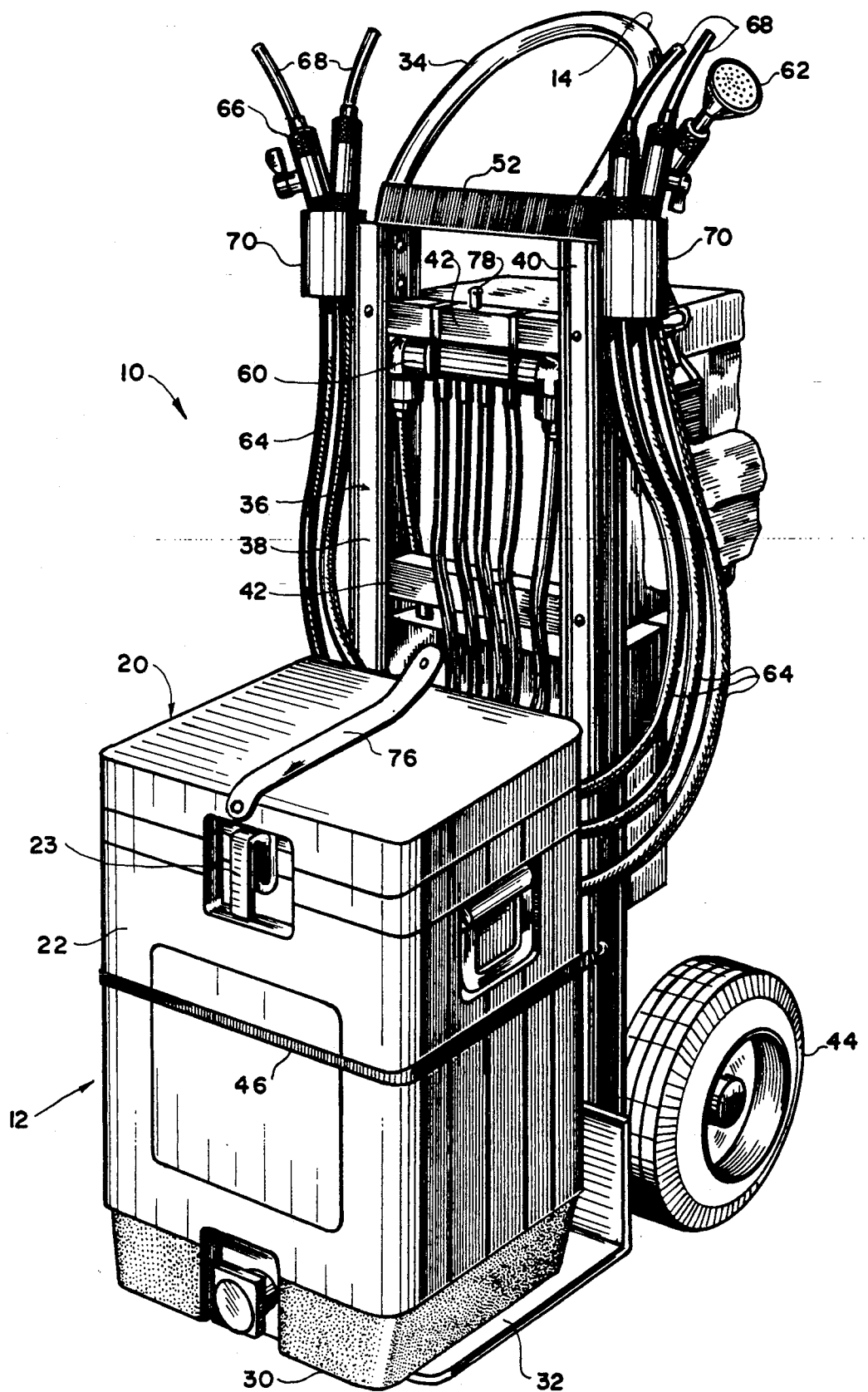
FIG. 1 is a perspective view of the apparatus in accordance with the present invention.
Figure 3:
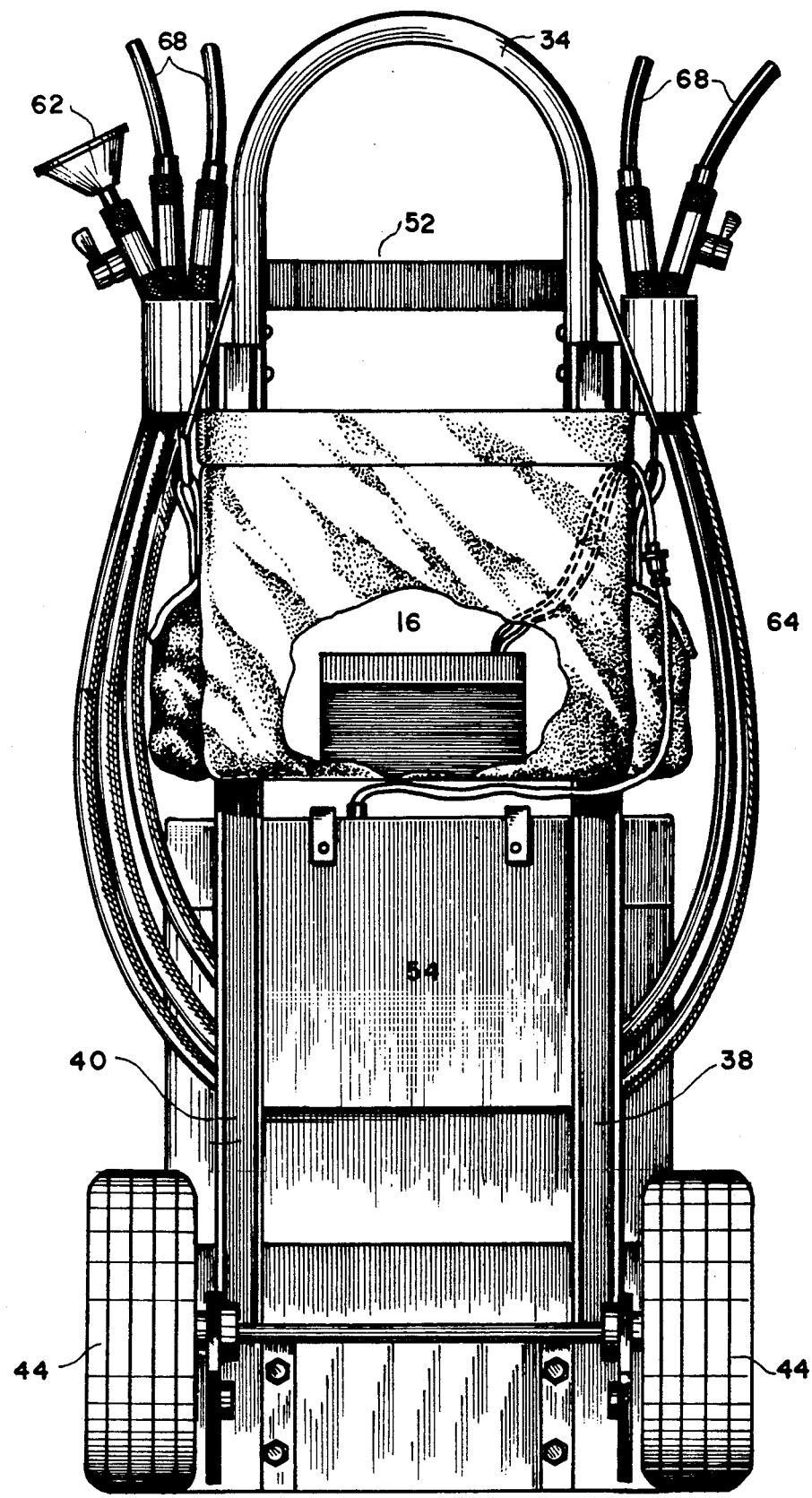
FIG. 3 is a rear view of the apparatus of the present invention.

Referring to the drawings in more detail, the apparatus of the present invention is seen designated by numeral 10. The apparatus 10 comprises a liquid container means 12 supported by a portable hand truck or dolly 14, a power source means 16 carried by the hand truck 14 and a pump means 18 which is electrically connected to the power source means 16.

The container means 12 is an insulated container having a parallelepiped or round configuration and which is provided with a detachable lid 20. The lid 20 can be secured to the continuous vertically extending side walls 22 of the container means 12 by conventional means, such as snaps 23, locks and other suitable means to prevent heat transfer between the exterior of the container means 12 and the interior thereof. The closed bottom and the side walls 22 of the container means 12 are formed from a substantially strong material to withstand possible field damage and might have one or more insulation layers within the side walls 22. The container lid 20 may be likewise insulated.

The interior chamber formed within the container means 12 is adapted to retain liquid, such as water or other liquid at a predetermined temperature for a limited period of time. The capacity of the container can be between 10 to 20 gallons, preferably not greater than that, bearing in mind that the container full of liquid will be manually transported by the hand truck 14 to the dispensing site. An opening 24 is formed in the rear wall 26 of the container lid 20 to receive one end of the main liquid conduit 28 in fitting engagement therein.

The bottom 30 of the container means 12 rests on the base plate 32 of the hand truck means 14. The base plate 32 is oriented horizontally, supporting the bottom 30 of the container means 12 in the horizontal orientation when the apparatus 10 is in use.

The hand truck 14 comprises a continuous handle 34 having an arcuate shape, opposite ends of which are fixedly attached to the frame means 36. The frame means 36 comprises a pair of opposing elongated bars 38 and 40 secured together with a number of transverse cross bars 42. The lower most ends of the elongated opposite parallel bars 38 and 40 are each secured to wheels 44 which can be provided with pneumatic or semipneumatic tires for easy transportation of the hand truck 14 to the desired location.

A securing strap 46 spans around three sides of the side walls 22 of the container means 12 and passes around the rear of the frame bars 38 and 40 to secure position of the container means 12 on the base plate 32. A buckle 48, or other suitable securing means, allows detachable positioning of the securing strap 46 about the perimeter of the side walls 22.

A power source means 16 is positioned within a carrier 50 which is sized to house the power source means 16 therein. Carrier 50, in some of the embodiments, is formed as an insulated carrier. A suspension strap 52 which is secured to the carrier 50 on opposite ends thereof forms a loop to allow placing of the strap 52 about the vertically extending frame means 36 and the handle 34 of the hand truck 14.

The power source means 16 is a rechargeable battery, for example a 12 volt. 6.5 amps which is recharged by the automatic conventional recharger which is conveniently provided for use with the apparatus of the present invention. The recharger should preferably have an indicator, such as a light indicator, so as to alert the user that the charging of the battery has been complete.

Mounted on the frame means 36, on the rear side thereof is a pump housing 54 which houses a pump means 18. The pump housing 54 is provided with suitable openings through the walls thereof to permit exit of the main conduit 28 leading from the container means 12 to the inlet side of the pump means 18 and through the discharge side of the pump means 18, to the exterior pump housing 54. Suitable wires or cables 56 electrically connect the power source means 16 with the pump means 18.

The main conduit 28 is provided with a filter 29, such as a stainless steel filter on the suction, inlet side thereof to prevent damage to the pump 18. When the main conduit 28 enters the lid 20 of the container means 12, it bends at about right angle downwardly, so as to reach the bottom of the container means 12.

The outlet of the main conduit 28 is connected to a manifold 60 which is secured to one of the transverse bars 42 of the frame means 36.

An on/off switch 21 is provided on the side of the housing 54. The switch 21 connects or disconnects electrical connection between the battery 16 and the pump 18. Additionally, the pump means 18 is provided with a pressure switch 19 which allows the pump to be disconnected from the power source 16 when the pressure of a predetermined value, for example 40 psi is retained within the conduit/manifold/pump system.

When demand for dispensing of water is indicated, the pressure within the conduit/manifold/pump system drops, which activates the pressure switch 19, which in turn closes the circuit between the power source means 16 and the pump means 18 to activate the pump and allow dispensing of the liquid. The on/off switch 21 is in the "on" position at that time. The liquid is then pumped from the interior of the container means 12, through the pump means 16 into the manifold 60. The manifold 60 is provided with a plurality of downwardly facing openings which serve as manifold exits for liquid dispensing through a matching plurality of individual dispensing conduits 64 each fitted within the openings.

The manifold 60 can be provided with four or more such openings to allow connection of the desired number of the dispensing conduits 64 thereto. The opposite, dispensing ends of the conduits 64 are each provided with suitable valve/lever assembly 66, which are for example lever type actuators, which are normally closed to retain the pressure in the fluid system within the conduit/manifold/pump system means 12.

When the lever is manipulated or turned, the valves of the valve/lever assembly 66 open, allowing dispensing of the liquid through the nozzles 68. The lever is calibrated for determining the flow rate through the assembly 66. The nozzles 68 extend to a distance from the valves 66 to allow positioning of the nozzles 68 within helmets or other protective head gear of the athlete and direct the dispensing fluid into the mouth of the user. For example, a nozzle of about 4 inches in length was found suitable for such purposes. The nozzles 68 are easily replaceable and can be of a "plug in" type, if desired.

One of the dispensing conduits 64 can be conveniently provided with a nozzle which has an attachment 62, similar to the shower head, to allow misting of the athlete's body for cooling down in cases of overheating or for cleaning of eyes or minor wounds. The flexible dispensing conduits 64 are made of sufficient length to be extended to a distance from the main frame means 36 of the apparatus 10.

To prevent the dispensing conduits 64 from tangling together, a pair of securing collars 70 are attached to respective opposite bars 38 and 40 adjacent the area of connection of the bars 38 and 40 with the handle 34. The collars 70 are continuous collars and allow the actuators 66 to rest on the upper edge thereof. The length and weight of the flexible conduits or hoses 64 will keep the nozzle pieces 68 in an upright orientation. When in use, an individual dispensing conduit 64 is pulled upwardly, moving the conduit 64 up and out of the collar 70 to the desired distance to allow convenient dispensing of water, or other liquid.

The container means 12 can be filled by easily operating the snap 23 on the lid 20 and removing the lid for access to the open top of the container and depositing of the liquid within the container 12. The top surface of the container lid 20 is preferably made flat, so as to allow stacking of the second container on top of the first container and transportation of both containers to the desired location.

When the apparatus 10 is in storage or the container is empty, a pressure activated automatic "dry tank" shut off switch 25, which is provided to prevent activation of the pump, overrides the pressure switch 19 and retains the battery in an "off" position to prevent its unnecessary drainage. The switch 25 will also disconnect the electrical connection between the pump 18 and the battery 16 when the container 12 becomes empty. For this purpose, the pressure switch 25 is secured within the conduit 28. The pump is regulated so that all nozzles 64 can be in use at the same time, supplying sufficient liquid to the outlets of the nozzles 64. The dispensing valve/lever assemblies 66 are easily regulated to allow only the desired amount of liquid to exit the nozzles 68.

The lid 20 of the container 12 can be temporarily secured in a raised position to allow filling or emptying of the container 12. For this purpose, a flexible strap 76 is secured to a front wall of the lid 20. A snap is attached to the flexible strap 76 for engaging with a matching snap 78 which is secured on the upper cross bar 42.

All liquid conduits, valves and nozzles are formed from materials suitable for dispensing of drinking water.

The valve/lever assemblies 66 can be PVC valves, the filter on the intake side of the main conduit 28 is preferably stainless steel and the conduits can be braided reinforced plastic hoses.

The container means 12 can be formed from suitably insulated polyurethane material, while the battery carrier 50 can be in the form of a nylon bag with an elongated strap 52 or a simple wire basket. Additional equipment, such as towels, tape, scissors, etc. can be positioned within the carrier 50 and transported along with the cooler 12 to the site of the sporting event. The battery 16 and the pump 18 along with associated wiring 56, can be positioned within one container or box 54, leaving the carrier 50 for use for other purposes. The apparatus 10 is not limited to use by athletes. It can be used at construction sites for the same purposes or at other locations where large amounts of drinking water are required and where there is no easy access to conventional water supplies.

While only one embodiment was described herein, it is to be understood that the description of the preferred embodiment was made for illustrative purposes in accordance with the requirements of the law and should not be construed in the limiting sense. I, therefore, pray that my rights to the present invention be limited only by the scope of the appended claims.

I claim:

1. A portable liquid dispensing apparatus, comprising:
   a portable carrier means;
   an insulated liquid container means for retaining a liquid mounted on said carrier means;
   a pump for pumping said liquid from said container means, said pump being provided with a pressure switch;
   a conduit means for fluidly connecting said container means with a discharge end of the pump;
   a portable electrical energy source for supplying electrical power for operating the pump, said energy source being mounted on the carrier;
   at least one liquid dispensing means having a normally closed valve positioned therein, said valve having a handle control means for opening and closing a fluid communication between said conduit means and said at least one liquid dispensing means, and wherein opening of the valve means activates the pump pressure switch to activate operation of the pump and transfer the liquid from the container means to said at least one liquid dispensing means; and
   a disengageable stabilizing means for stabilizing position of said liquid container means on said portable carrier means, while allowing removal of said liquid container means from said carrier means.

2. The apparatus of claim 1, wherein said portable carrier means comprises a hand truck having an upwardly extending frame, a handle securedly attached to an upper part of the frame, a pair of wheels securedly attached to a lower part of the frame and a base plate extending substantially perpendicularly from and fixedly attached to the lower part of the frame.

3. The apparatus of claim 2, wherein said liquid container means is detachably supported by the base plate.

4. The apparatus of claim 1, wherein said liquid container means comprises a hollow body having a closed bottom, an open top and a detachable lid for covering the open top.

5. The apparatus of claim 4, wherein said lid has an opening extending through a thickness of the lid, said opening being sized and shaped to receive one end of the conduit means, such that a portion of the conduit means extends into the liquid container means.

6. The apparatus of claim 5, wherein a filter means is mounted on a portion of the conduit means extending into the container.

7. The apparatus of claim 1, wherein said conduit means comprises a first flexible hose extending from an interior of the liquid container means to an intake side of the pump, a second flexible hose extending from a discharge side of the pump, a main manifold secured to the carrier means, said second hose being connected to the main manifold to allow fluid communication between the pump and the main manifold, said main manifold being provided with at least one outlet aperture and said at least one liquid dispensing means is adapted to fittingly engage about said outlet aperture.

8. The apparatus of claim 7, wherein said at least one liquid dispensing means comprises a flexible hose having one end attached to the main manifold and a second liquid dispensing end, and wherein said handle control means is positioned a distance from said second end.

9. The apparatus of claim 1, wherein said handle control means comprises a means for regulating a liquid flow through said at least one liquid dispensing means.

10. The apparatus of claim 2, wherein said pump is mounted on and carried by said frame.

11. The apparatus of claim 1, wherein said portable electrical power source is a rechargeable battery.

12. The apparatus of claim 2, further comprising at least one collar for retaining said at least one liquid dispensing conduit in a position adjacent to the frame, said collar being securely attached to an upper portion of the frame, said collar allowing to move said at least one liquid dispensing conduit within said collar to a convenient extension, thereby facilitating dispensing of a liquid.

13. The apparatus of claim 1, further comprising a plurality of liquid dispensing means.

14. The apparatus of claim 7, further comprising at least one spraying conduit in fluid communication with said main manifold.

15. The apparatus of claim 1, further comprising an automatic dry tank shut off switch mounted between the power source and the pump.

16. The device of claim 1, further comprising a portable charging device for re-charging the electrical energy source.

17. A portable liquid dispensing apparatus, comprising:
   a portable carrier means, said carrier means comprising a hand truck having an upwardly extending frame, a handle securedly attached to an upper part of the frame, a pair of wheels securedly attached to a lower part of the frame and a base plate extending substantially perpendicularly from and fixedly attached to the lower part of the frame;
   an insulated liquid container means for retaining the liquid detachably supported on said base plate, said liquid container means comprising a hollow body having a closed bottom, an open top and a detachable lid for covering the open top, said lid being provided with an aperture extending through a thickness of the lid;
   a pump for pumping said liquid from said container means, said pump being provided with a pressure switch;

a conduit means for fluidly connecting said container means with a discharge end of the pump, said conduit, means comprising a first flexible hose having a filter, said hose extending from an interior of said liquid container means to an intake side of the pump, and a second flexible hose extending from a discharge side of the pump;

a main manifold secured to the frame of the carrier means, said second flexible hose being connected to the main manifold to allow fluid communication between the pump and the main manifold, said main manifold being provided with at least one outlet aperture;

a rechargeable battery for supplying electrical power for operating the pump, said battery being positioned in a housing which is detachably positioned on the frame of the carrier means; and a plurality of liquid dispensing means, each having a normally closed valve positioned therein, said valve having a handle control means for opening, closing and controlling flow rate and a fluid communication between said conduit means and the dispensing means, and wherein the opening of the valve means activates the pump pressure switch to activate operation of the pump and transfer the liquid from the container means to the dispensing means.

18. The apparatus of claim 17, wherein the filter is mounted on one end of the first flexible hose extending into the interior of the liquid container means.

19. The apparatus of claim 17, wherein each of said liquid dispensing means comprises a flexible hose having one end attached to the manifold and a second liquid dispensing end, and wherein said handle control means is positioned a distance from said second end.

20. The apparatus of claim 17, further comprising a pair of collars securely attached to opposite sides of an upper portion of the frame, said liquid dispensing means comprises conduits being retained by said collars, while being allowed to move within said collars to facilitate convenient extendable withdrawal of the liquid dispensing conduits for each of liquid dispensing.

21. The apparatus of claim 17, further comprising at least one spraying conduit in fluid communication with said main manifold.

22. The apparatus of claim 17, further comprising a automatic dry tank shut off switch mounted between the power source and the pump.

23. The apparatus of claim 2, wherein said container means stabilizing means comprises a flexible strap spanning around substantially an entire perimeter of the liquid container means and selectively movable along a vertical length of the liquid container means.

24. The apparatus of claim 4, further comprising means for temporary securing the lid in a raised position to allow easy access to the interior of the liquid container means.

25. The apparatus of claim 24, wherein said lid securing means comprises a flexible strap secured at one of its ends to a front wall of the lid, said lid securing strap having a second end provided with a snap adapted to be engaged with a matching snap secured to a frame member of the portable carrier means.

26. The apparatus of claim 17, further comprising disengageable stabilizing means for stabilizing position of the liquid container means on the portable carrier means.

27. The apparatus of claim 26, wherein said stabilizing means comprises an elongated flexible strap spanning about substantially an entire perimeter of the liquid container means and selectively movable along a vertical length of the liquid container means.

28. The apparatus of claim 17, further comprising means for temporary securing position of the lid in a raised position to allow easy access to the liquid container means.

29. The apparatus of claim 28, wherein said securing means comprises a flexible lid securing strap secured at one of its ends to a front wall of the lid, said securing strap having a second end provided with a snap adapted to be engaged with a matching snap secured to a frame member of the portable carrier means.

* * * * *